May 24, 1932.  J. F. HAWORTH  1,859,561
CABLE OR WIRE CLAMP
Filed June 8, 1929  2 Sheets-Sheet 1
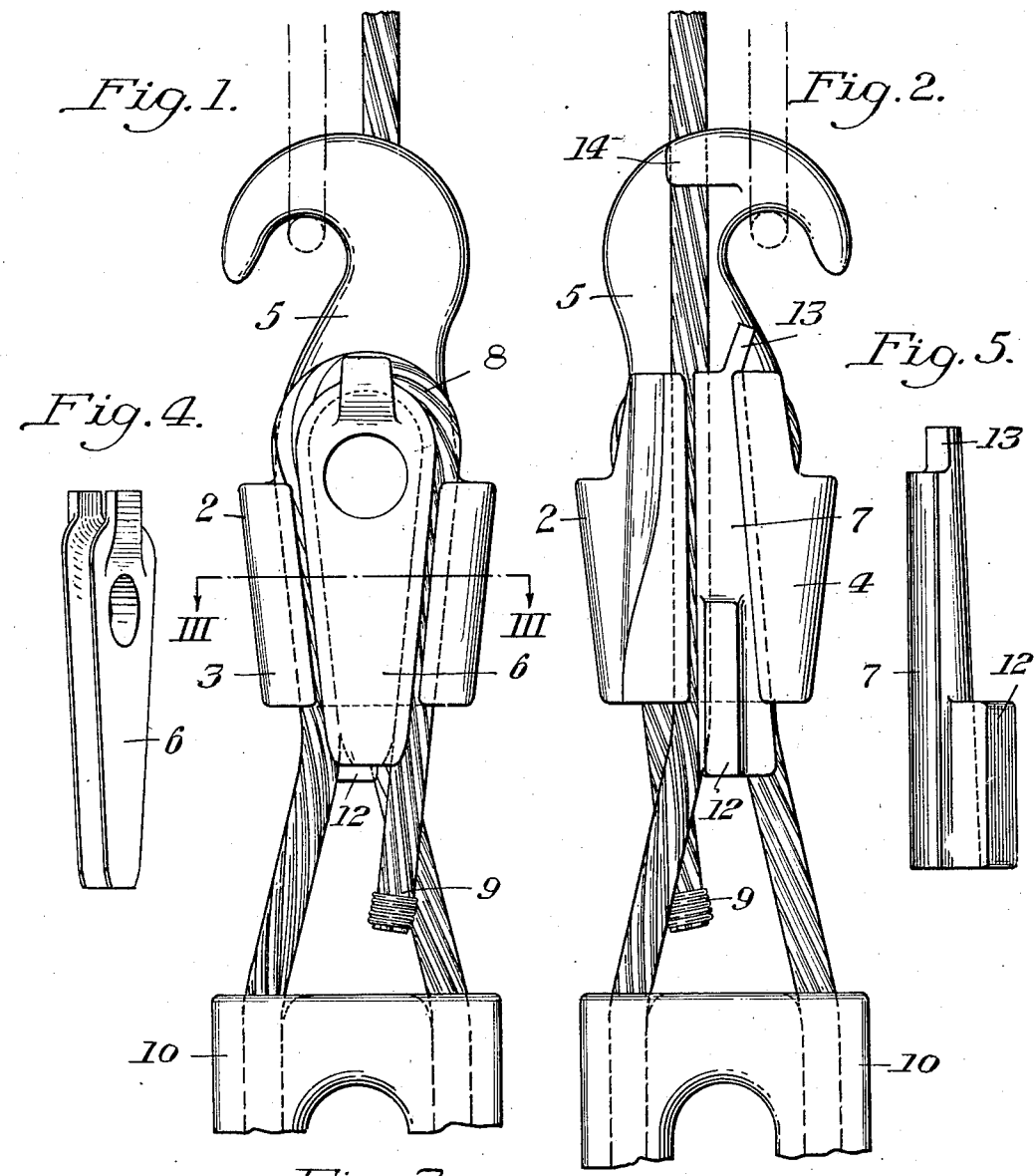

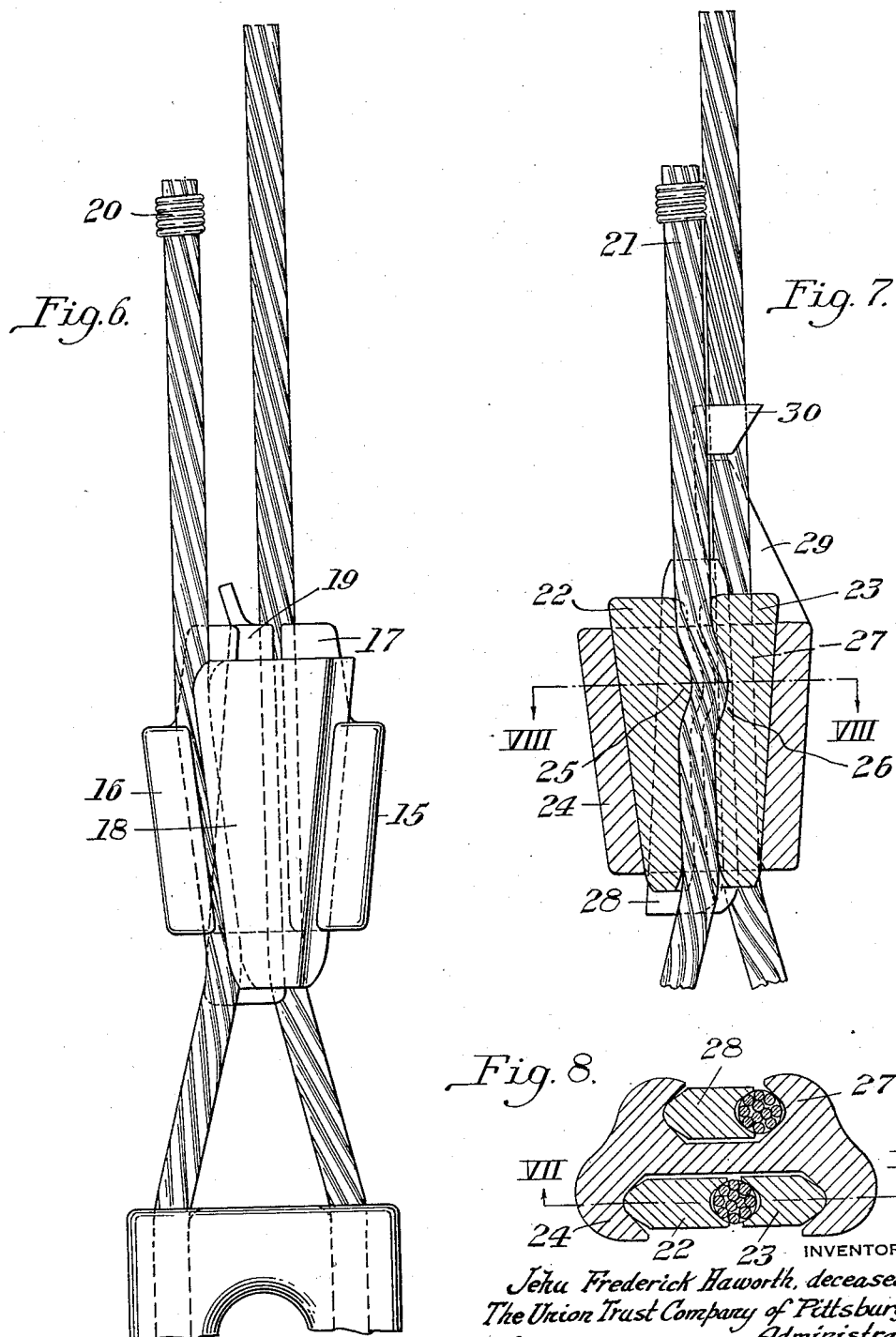

Patented May 24, 1932

1,859,561

UNITED STATES PATENT OFFICE

JEHU FREDERIC HAWORTH, DECEASED, LATE OF EDGEWORTH, PENNSYLVANIA, BY THE UNION TRUST COMPANY OF PITTSBURGH, OF PITTSBURGH, PENNSYLVANIA, ADMINISTRATOR, ASSIGNOR TO SARA KING HAWORTH, OF EDGEWORTH, PENNSYLVANIA

CABLE OR WIRE CLAMP

Application filed June 8, 1929. Serial No. 369,386.

This invention relates to cable or wire clamps and more particularly to clamps for anchoring cables or wires such as are used in supporting line poles and the like. The invention relates still more particularly to cable or wire clamps adapted for clamping a cable or wire at spaced points along its length so as to provide a fixed loop adapted to encircle a pole, pass through the opening in an insulator or be connected to some other anchoring means.

The invention additionally relates to the application of a cable or wire clamp of the type embodying a housing and wedge means cooperating with the housing for clamping a portion of a cable or wire therein to a clamp for maintaining a fixed loop in a cable or wire. Clamps of the wedge type have heretofore been known but on account of the fact that such clamps comprise a housing tapered in one direction and having a tapered wedge fitting therein to clamp the cable, they have not been considered applicable for the provision of a fixed cable loop.

There is provided a cable or wire clamp, comprising a body having housing means thereon and wedge means cooperating therewith for clamping a cable or wire at spaced points along its length, whereby to provide at least one fixed loop in the cable or wire. Other objects and advantages of the invention will become apparent as the following description of certain present preferred embodiments thereof proceeds.

In the accompanying drawings, there are shown certain present preferred embodiments of the invention, wherein Figure 1 is a plan view of a cable or wire clamp having a cable clamped therein so as to form a fixed loop;

Figure 2 is a plan view looking from the opposite side of the clamp shown in Figure 1;

Figure 3 is a cross section taken on the line III—III of Figure 1;

Figure 4 is a perspective view of a clamping wedge;

Figure 5 is a perspective view of another clamping wedge;

Figure 6 is a plan view of a modified form of construction;

Figure 7 is a cross sectional view taken on the line VII—VII of Figure 8, and showing a modified form of construction; and Figure 8 is a cross section taken on the line VIII—VIII of Figure 7.

Referring more particularly to the drawings, there is shown in Figures 1, 2 and 3 a cable or wire clamp comprising a body portion 2 having connected therewith at opposite sides tapered housings 3 and 4, respectively. The taper of the housing 3 is in the opposite direction to that of the housing 4. The housing 3 is somewhat larger in size than the housing 4 for a purpose to be presently explained.

Connected with the body portion 2 at the extremity thereof adjacent the larger end of the housing 3 is a hook portion 5. A wedge 6 is provided for cooperation with the housing 3 and a wedge 7 for cooperation with the housing 4.

In the use of the clamp above referred to a loop 8 of a cable is disposed about the wedge 6 as shown in Figure 1 and the wedge with such loop disposed thereabout is inserted into the housing 3. It will be noted that the dead end 9 of the cable is reversed so that it extends generally in the direction of strain. The end of the cable will be automatically clamped between the wedge and housing when tension is applied to it. The running end of the cable passes from the housing 3 through an insulator 10 and then is looped back to pass through the housing 4. The wedge 7 is then driven into the housing 4 to clamp the portion of the cable contained within such housing. The wedge 7 is provided with an enlarged portion 12 by which it may be driven into the socket 4.

Tension on the cable always tends to tighten the wedge 6 within the housing 3. After the cable has been passed through the insulator and is returned to the housing 4 and the wedge 7 inserted therein further tension on the cable tends to cause it to slide through the housing 4 in a direction from bottom to top viewing Figures 1 and 2. Hence a strain on the cable will always tend to urge the wedge 7 more firmly within the socket 4 and thus increase the clamping grip on the cable. In this way, the cable always tends to tighten the clamping grip of the respective clamping members upon the portions of it engaged thereby.

As an added safety measure to insure that the wedge 7 will not become loosened and slide out of the socket 4, such wedge is provided with a deformable extremity 13 which is initially in extension of the body of the wedge as shown in Figure 5, but which after the wedge has been inserted and tightened within the socket may be laterally displaced as shown in Figure 2 by a single blow of a hammer to engage the upper edge of the housing 4 and thus always hold the wedge positively in place within the housing and in clamping relationship with the cable. The hook portion 5 of the clamp is for the attachment of a tensioning line to tighten the cable while it is being clamped in place. Such portion is provided with an ear 14 adapted to embrace the running end of the cable and thus assist in more positively maintaining the clamp in its proper position with respect to the cable.

A wedge and housing for clamping a cable in the manner of the members 3 and 6 is adapted only for the dead end and cannot be used to advantage on the running or tensioned end of the cable. However, it is not necessary to clamp the dead end of the cable by inserting a wedge within a loop thereof as the dead end may sometimes to advantage be clamped only at a single portion of its length. A clamp for this purpose is shown in Figure 6. There is provided a body portion 15 having oppositely disposed housings 16 and 17 similar to the housings 3 and 4 of Figures 1, 2 and 3.

The housing 16 has a wedge 18 cooperating therewith and the housing 17 has a wedge 19. The dead end 20 of the cable instead of passing around the wedge 18 is clamped between such wedge and one side of the housing 16. This being the case, the dead end may be used for the reception of a "come along" by which the tension for tightening the cable while the clamp is being applied may be imparted to it. Thus when only a single length of the dead end of the cable is clamped the hook corresponding to the hook 5 of Figures 1 and 2 may be done away with. The running end of the cable of Figure 6 is clamped between the wedge 19 and the housing 17 in the same manner as in Figures 1 and 2.

A further modification is shown in Figures 7 and 8 wherein the dead end 21 of a cable is clamped between two separate wedges 22 and 23 within a housing 24. The wedge 22 has on its cable engaging face a slight rounded projection 25 and the wedge 23 has a depression 26 corresponding to the projection 25 of the wedge 22, so that when the dead end is tightened between the wedges 22 and 23, it will be deformed to increase the clamping grip thereon. A portion of the length of the cable will be forced laterally with respect to the line of its axis, thus establishing a firmer grip upon the cable and tending to more securely hold the wedges 22 and 23 in cable engaging position within the housing 24.

The running end of the cable of Figure 7 is clamped within a housing 27 by a wedge 28. There is connected to the clamp an extension 29 having an ear 30 for embracing a portion of the running end of the cable to more positively maintain the clamp in its proper position. The ear 30 is analogous in purpose to the ear 14 shown in Figure 2.

By the use of the invention a fixed loop may be formed in a cable near its end without the necessity of applying nuts and bolts or any tightening means except the wedges which tend to tighten themselves within their respective housings upon tensioning of the cable. The housings need not be on opposite sides of the body of the clamp but may be disposed beside each other on the same side of the body. If desired, a supplemental driven wedge may be used such, for example, as disclosed in Patent No. 1,622,110 granted March 22, 1927.

While there have been shown and described certain present preferred embodiments of the invention, it is to be distinctly understood that the same is not limited thereto but may be otherwise variously embodied within the scope of the following claims.

What is claimed is:—

1. A cable or wire clamp, comprising a body portion having oppositely tapered housings on opposite sides thereof for the reception of portions of a cable or wire and wedge means cooperating with each of the housings for clamping the cable or wire at the portion contained therein, at least one of the housings being open laterally of the clamp to permit a portion of the cable or wire removed from an end thereof to be moved laterally into such housing.

2. A cable or wire clamp, comprising a body portion having engaging means at one end thereof and having on one side a housing and means cooperating therewith for clamping a cable or wire near the end thereof and having on the opposite side a housing and means cooperating therewith for clamping the cable or wire at a single run thereof only removed from said end, whereby to provide a fixed loop in the cable or wire such that both extremities of such loop enter the body portion from the end thereof opposite that at which the engaging means is disposed.

3. A cable or wire clamp, comprising a body having oppositely tapered housing means at opposite sides thereof and wedge means cooperating therewith for clamping a cable or wire at spaced points along its length, whereby to provide at least one fixed loop in the cable or wire.

4. A cable or wire clamp, comprising a body having housing means thereon, wedge means cooperating therewith for clamping a cable or wire at one portion of its length, and other wedge means cooperating therewith for clamping the cable or wire at a second portion of its length comprising a single run thereof only removed from the first portion, whereby to form a loop adapted to engage a pole, insulator or the like, the housing means having a plurality of lateral openings to permit the respective portions of the cable or wire to be moved laterally thereinto.

5. A cable or wire clamp, comprising housing means for cooperation with a cable or wire at a plurality of portions thereof, one of such portions being a single run only, means cooperating with the housing means for clamping the cable or wire at each of such portions, and an engaging device at one end of the housing.

6. A cable or wire clamp, comprising means adapted to only partially surround a cable or wire at spaced portions of its length, one of such portions passing through the clamp without substantial change of direction, and separate means cooperating therewith for clamping the cable or wire at each of such portions.

7. A cable or wire clamp, comprising a housing for containing a portion of a cable or wire and a wedge cooperating therewith for clamping the cable or wire, the wedge having means adapted to be deformed to engage the housing to prevent the wedge from becoming disengaged from cable or wire clamping position.

8. A cable or wire clamp, comprising means for engaging a cable or wire and wedge clamping means cooperating therewith for clamping the cable or wire, the wedge clamping means having at its smaller end means adapted to be deformed to engage the first-mentioned means when in clamping position to prevent the wedge clamping means from slipping out of position.

9. A cable or wire clamp, comprising a body having means for clamping a cable or wire near its end, the extremity of the cable or wire being turned out of the line to be assumed by the tensioned portion thereof and means for clamping the cable or wire further from its end, the body also having means for attaching a tensioning line to tighten the cable before the second mentioned clamping means is engaged with the cable or wire to clamp it.

10. A cable or wire clamp adapted to provide a fixed loop adjacent a free end of a cable or wire under tension from its opposite end, comprising oppositely disposed housings tapered in opposite directions at least one of which is adapted to contain a single run only of the cable or wire, and clamping means adapted to extend within each of such housings to positively clamp a portion of the cable or wire therein, at least one of the housings being open laterally of the clamp to permit a portion of the cable or wire removed from an end thereof to be moved laterally into such housing.

11. A cable or wire clamp adapted to provide a fixed loop adjacent a free end of a cable or wire under tension from its opposite end, comprising a body member adapted to be supported and suspended by the cable or wire itself and comprising two oppositely disposed housings, at least one of which is adapted to contain a single run only of the cable or wire, and clamping means cooperating with such housings for positively clamping the portions of the cable or wire contained therein.

12. A cable or wire clamp adapted to provide a fixed loop adjacent a free end of a cable or wire under tension from its opposite end, comprising a body member adapted to be supported and suspended by the cable or wire itself and comprising two directly opposite housings back to back tapered in opposite directions, at least one of such housings being adapted to contain a single run only of the cable or wire and at least one of such housings being open laterally to permit a portion of the cable or wire to be moved laterally thereinto, and wedges cooperating with the housings for positively clamping the portions of the cable or wire contained therein.

13. A cable or wire clamp, comprising a housing adapted to contain a single run of tensioned cable or wire intermediate its ends, means cooperating with the housing to clamp such run of cable or wire, such means having an offset portion whereby to deform the cable or wire to assist in clamping it, and means for clamping the cable or wire near its end to provide a fixed loop therein.

THE UNION TRUST COMPANY OF PITTSBURGH,
By CARROLL P. DAVIS,
*Trust Officer,*
*Administrator C. T. A. of Jehu Frederic Haworth, Deceased.*